Patented Apr. 15, 1924.

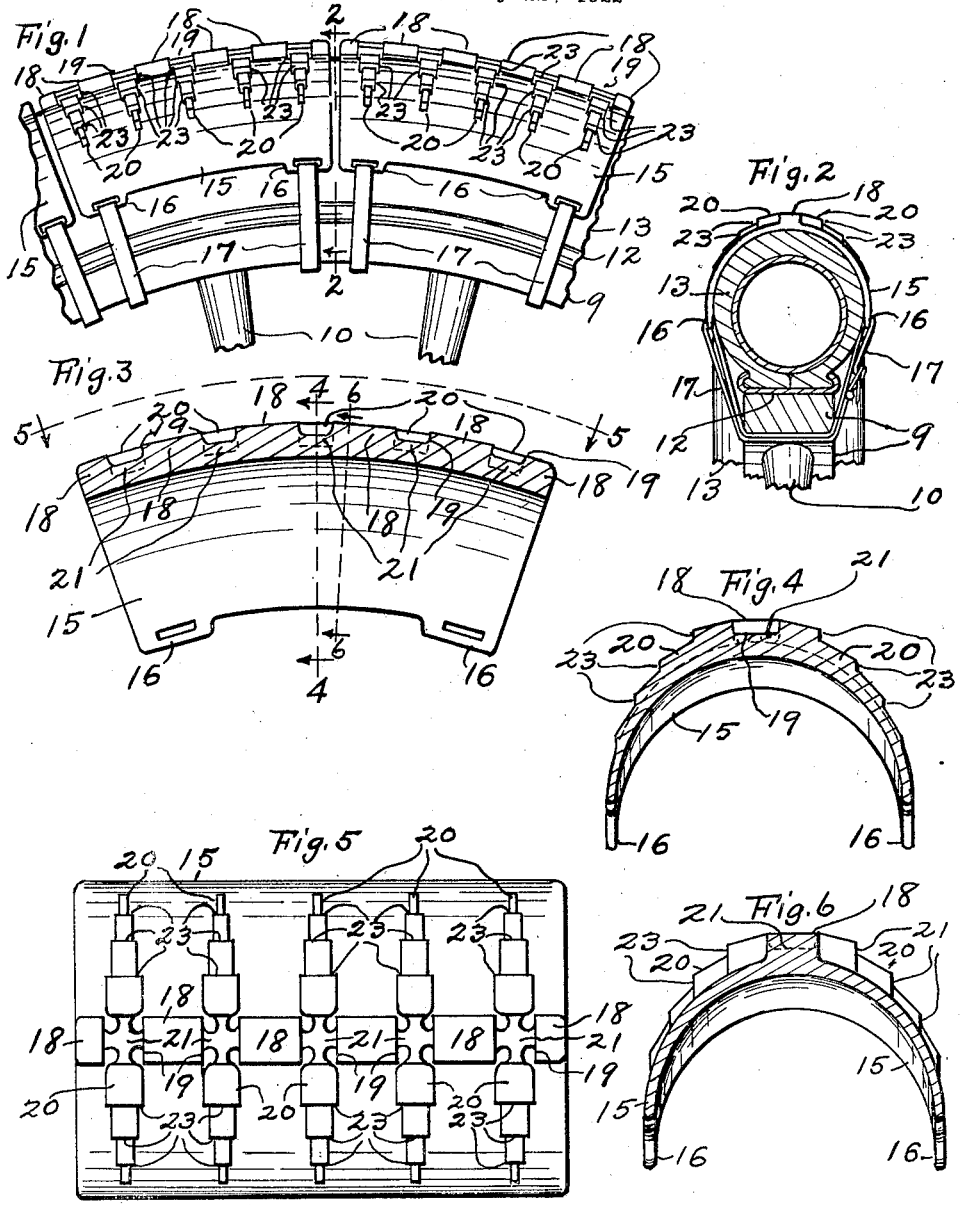

1,490,893

UNITED STATES PATENT OFFICE.

OTTO B. ROTHERMEL, OF CLEVELAND, OHIO.

ANTISKID DEVICE FOR VEHICLE WHEELS.

Application filed May 22, 1922. Serial No. 562,641.

*To all whom it may concern:*

Be it known that I, OTTO B. ROTHERMEL, a citizen of the United States, residing at Cleveland, in the county of Cuyahoga and State of Ohio, have invented a new and useful Antiskid Device for Vehicle Wheels, of which the following is a specification.

This invention relates to improvements in antiskid devices for vehicle-wheels, and more especially to a rigid antiskid shoe adapted to be applied to an elastic and compressible tire of a wheel of a motor-vehicle and contoured as required to prevent sidewise skidding and endwise slipping of the shoe.

The primary object of this invention is to produce an antiskid shoe of the character indicated which is not only shaped as required to conform to the tire but which has its outer side of such configuration as to render the shoe remarkably effective and reliable in the performance of its functions.

Another object is to produce an antiskid shoe which can be made at a low cost and is readily applied.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is an elevation of a portion of a vehicle-wheel provided with antiskid shoes embodying my invention. Fig. 2 is a transverse section taken along the line 2—2 in Fig. 1. Fig. 3 is a central longitudinal section of my improved antiskid shoe. Fig. 4 is a transverse section taken along the line 4—4 in Fig. 3. Fig. 5 is a view taken along the curved line 5—5 in Fig. 4. Fig. 6 is a transverse section taken along the line 6—6 in Fig. 4. Figs. 3, 4, 5 and 6 are drawn on a larger scale than Figs. 1 and 2.

Referring to said drawings, 9 (see Figs. 1 and 2) indicates a portion of the felly of a vehicle-wheel; 10, the outer portions of two adjacent spokes of the wheel; 12, a portion of the metal rim on the felly, and 13, an elastic and compressible tire on said rim.

My improved antiskid device for a vehicle-wheel is shown detached in Figs. 3, 4, 5 and 6 and comprises a shoe 15 which is preferably rigid and composed of a single malleable metal casting and curved longitudinally and transversely conformably to the outer circumferential surface of the tire to which said shoe is to be applied. Preferably said shoe is mounted on the tire opposite the outer end of a spoke of the wheel and has the length and arrangement required, in relation to said spoke, to cause the shoe to extend from a point opposite the center of said end of said spoke equidistantly circumferentially of the wheel in opposite directions, and the wheel is equipped with any suitable number of circumferentially spaced antiskid shoes embodying my invention.

My improved antiskid shoe is adapted to straddle the tire and shown provided at each end with a pair of ears 16 formed on the shoe at opposite longitudinal edges respectively of the shoe, and the shoe is attached at said ears to the felly of the wheel by straps 17 applied in any approved manner, as shown in Figs. 1 and 2.

My improved antiskid shoe is provided, at its outer side and centrally, with a row of projecting members 18 spaced and extending longitudinally of the shoe. Each projecting member 18 has opposite sides thereof facing laterally in opposite directions respectively and arranged in substantially parallel vertical planes and has its two end faces substantially at a right angle to said sides and facing endwise of the shoe in opposite directions respectively. Said projecting members 18 prevent slipping of the shoe transversely of the road and consequently prevent sidewise skidding of the vehicle, and it will be observed that said members 18, being spaced longitudinally of the shoe, afford a foothold or traction to the shoe and consequently for the wheel.

My improved antiskid shoe is provided, at its outer side and adjacent the space 19 between adjacent members of the row of projecting members 18, with two transverse ribs 20 arranged preferably wholly at opposite sides respectively of said space and extending transversely of the outer side of the shoe between said space and opposite longitudinal edges respectively of the shoe.

Preferably my improved antiskid shoe (see Figs. 3, 4 and 5) is provided, between the opposing end faces of adjacent projecting members 18, with a cross-shaped reinforcing web 21 formed between the inner portions of said faces and forming a connection between each of said faces and the inner portions of the adjacent end faces of the adjacent transverse ribs 20.

Each transverse rib 20 (see Fig. 5) is preferably spaced at its inner end from the adjacent side edges of the adjacent end faces of the adjacent projecting members 18 so as to permit the passage of water between said end of said rib and the adjacent ends of said projecting members 18 and so as to permit water to flow through the space formed at the outer side of the web 21 between said projecting members 18, from one side to the other side of said rib at the inner extremity of the rib.

The hereinbefore described antiskid shoe, it will be observed, is therefore provided, at its outer side and between each longitudinal edge of the shoe and the central longitudinal portion of the shoe, with ribs spaced longitudinally of the shoe and extending transversely of the shoe from said longitudinal portion in the direction of said edge, and said ribs obviously afford foothold or traction to the shoe and consequently to the wheel.

It will be observed also that each transverse rib 20 has several laterally and outwardly facing antiskid shoulders 23 spaced endwise of the rib and arranged in substantially parallel vertical planes, and said shoulders, and more especially the shoulder nearest the inner extremity of the rib, are of vast importance in materially assisting the members of the hereinbefore mentioned row of projecting members 18 in preventing sidewise skidding of the vehicle.

Preferably the inner of adjacent shoulders 23 of each rib 20 is larger in dimensions than the outer of said shoulders, so as to render said rib more effective and reliable in participating in the prevention of sidewise skidding of the vehicle.

Preferably each rib 20 has each portion thereof which extends between two adjacent shoulders 23 of the rib arranged centrally between and spaced from the side edges of the inner and larger of said shoulders, so that said larger of said shoulders is adapted to do antiskidding work at each side of said portion of the rib, and preferably each rib 20 has the portion thereof which extends between the larger of said shoulders and the inner extremity of the rib projecting farther than its portion between said shoulders from the body of the shoe.

Preferably each end face of the adjacent end faces of adjacent projecting members 18 and the adjacent side of the inner end portion of each of the adjacent transverse ribs 20 are in substantially the same vertical plane transversely of the shoe, and the sides of the projecting members 18 and the shoulders 23 of the ribs 20 constitute remarkably effective antiskid means without interfering with an effective utilization of said projecting members 18 as well as said ribs 20 in producing adequate traction for the shoe and consequently for a wheel provided with antiskid shoes embodying my invention.

What I claim is—

1. An antiskid device comprising a shoe which is curved conformably to a tire and, at its outer side and centrally between its longitudinal edges, has several projecting members spaced and extending longitudinally of the shoe and has two transverse ribs at opposite sides respectively of each of the spaces between said longitudinal projecting members, said shoe being provided, at each of said spaces, with a cross-shaped web arranged between the inner portions of the opposing end faces of the adjacent longitudinal projecting members and connecting said faces with the inner portions of the inner end faces of the adjacent transverse ribs.

2. An antiskid device comprising a shoe which is curved conformably to a tire and provided, at each side of the central longitudinal portion of the outer side of the shoe, with spaced transverse ribs having laterally and outwardly facing shoulders which are spaced endwise of the ribs, each rib having the inner of its adjacent shoulders larger in dimensions than the other of said shoulders.

3. An antiskid device comprising a shoe which is curved conformably to a tire and, at its outer side and between each longitudinal edge of the shoe and the central longitudinal portion of the shoe, has spaced ribs extending transversely of the shoe, each rib having laterally and outwardly facing shoulders which are spaced endwise of the rib, and said rib being thicker at the inner than at the outer of adjacent shoulders of the rib.

4. An antiskid device comprising a shoe which is curved conformably to a tire and, at its outer side and between each longitudinal edge of the shoe and the central longitudinal portion of the shoe, has spaced transverse ribs, each rib having spaced shoulders facing transversely of the shoe, the inner of adjacent shoulders of said rib being larger in dimensions than the outer of said shoulders, and said rib projecting farther at the inner than at the outer of said shoulders from the body of the shoe.

5. An antiskid device comprising a shoe which is curved conformably to a tire and provided, at its outer side and centrally between its longitudinal edges, with several projecting members spaced and extending longitudinally of the shoe, said shoe having two transverse ribs at opposite sides respectively of each of the spaces between said longitudinal projecting members, each rib having several laterally and outwardly facing shoulders spaced endwise of the rib and having the inner of adjacent shoulders larger in dimensions than the outer of said shoulders, and said rib projecting farther at the inner than at the outer of said shoulders from the body of the shoe.

In testimony whereof, I sign the foregoing specification, this 15th day of May, 1922.

OTTO B. ROTHERMEL.